United States Patent
Kenney et al.

(10) Patent No.: US 9,762,424 B2
(45) Date of Patent: *Sep. 12, 2017

(54) SYSTEMS, METHODS, AND APPARATUS FOR A LOW RATE PHY STRUCTURE

(71) Applicant: Intel Corporation, Santa Clara, CA (US)

(72) Inventors: Thomas J. Kenney, Portland, OR (US); Eldad Perahia, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/093,943

(22) Filed: Apr. 8, 2016

(65) Prior Publication Data

US 2016/0226692 A1 Aug. 4, 2016

Related U.S. Application Data

(63) Continuation of application No. 13/977,553, filed as application No. PCT/US2011/064674 on Dec. 13, 2011, now Pat. No. 9,313,301.

(Continued)

(51) Int. Cl.
*H04J 3/24* (2006.01)
*H04L 27/26* (2006.01)
(Continued)

(52) U.S. Cl.
CPC .......... *H04L 27/2613* (2013.01); *H04L 69/22* (2013.01); *H04L 69/323* (2013.01); *H04W 80/00* (2013.01); *H04W 84/12* (2013.01)

(58) Field of Classification Search
CPC ... H04L 27/2613; H04L 69/22; H04L 69/323; H04W 80/00; H04W 84/12
(Continued)

(56) References Cited

U.S. PATENT DOCUMENTS

| | | | |
|---|---|---|---|
| 6,114,999 A * | 9/2000 | Cassel et al. | ................. 343/702 |
| 7,711,061 B2 | 5/2010 | Trachewsky | |

(Continued)

FOREIGN PATENT DOCUMENTS

| | | |
|---|---|---|
| CN | 101444051 A | 5/2009 |
| CN | 101707917 A | 5/2010 |

(Continued)

OTHER PUBLICATIONS

"U.S. Appl. No. 13/977,553, Notice of Allowance mailed Dec. 4, 2015", 9 pgs.

(Continued)

*Primary Examiner* — Sai-Ming Chan
(74) *Attorney, Agent, or Firm* — Schwegman Lundberg & Woessner, P.A.

(57) ABSTRACT

Certain embodiments of the invention may include systems, methods, and apparatus for a low rate PHY structure. According to an example embodiment of the invention, a method is provided for generating a low rate PHY structure with low overhead. The method may include generating a preamble comprising one or more training fields; generating a data field; grouping the preamble and the data field into a low rate PHY structure; and converting the low rate PHY structure for wireless transmission over a hardware transmission medium.

18 Claims, 5 Drawing Sheets

Related U.S. Application Data (60) Provisional application No. 61/526,917, filed on Aug. 24, 2011.

(51) Int. Cl.

| | | |
|---|---|---|
| *H04W 80/00* | (2009.01) | |
| *H04L 29/08* | (2006.01) | |
| *H04L 29/06* | (2006.01) | |
| *H04W 84/12* | (2009.01) | |

(58) Field of Classification Search
USPC .......................................................... 370/474
See application file for complete search history.

(56) References Cited

U.S. PATENT DOCUMENTS

| | | |
|---|---|---|
| 7,860,128 B2 | 12/2010 | Niu et al. |
| 9,313,301 B2 | 4/2016 | Kenney et al. |
| 2007/0047666 A1 | 3/2007 | Trachewsky |
| 2009/0285339 A1 | 11/2009 | Zhang et al. |
| 2011/0013722 A1 | 1/2011 | Wu et al. |
| 2011/0051706 A1 | 3/2011 | Schmidl et al. |
| 2011/0051747 A1 | 3/2011 | Schmidl et al. |
| 2014/0140357 A1 | 5/2014 | Kenney et al. |

FOREIGN PATENT DOCUMENTS

| | | |
|---|---|---|
| EP | 2495884 A2 | 9/2012 |
| JP | 2014511094 A | 5/2014 |
| KR | 101618671 B1 | 5/2016 |
| WO | WO-2011026079 A2 | 3/2011 |
| WO | WO-2011053069 A2 | 5/2011 |
| WO | WO-2012142612 A1 | 10/2012 |

OTHER PUBLICATIONS

"Chinese Application Serial No. 201180073136.X, Office Action mailed Dec. 30, 2015", with Machine Translation, 12 pgs.
"International Application Serial No. PCT/U62011/064674, International Preliminary Report on Patentability mailed Mar. 6, 2014", 6 pgs.
"International Application Serial No. PCT/US2011/064674, International Search Report mailed Jul. 30, 2012", 3 pgs.
"International Application Serial No. PCT/US2011/064674, Written Opinion mailed Jul. 30, 2012", 4 pgs.
"Chinese Application Serial No. 20118007316.X, Office Action mailed Sep. 1, 2016", W/ English Translation, 18 pgs.
"Chinese Application Serial No. 201180073136.X, Response filed May 11, 2016 to Office Action mailed Dec. 30, 2015", W/ English Translation of Claims, 14 pgs.
"European Application Serial No. 11871143.1, Communication Pursuant to Article 94(3) EPC mailed Nov. 17, 2016", 5 pgs.
"European Application Serial No. 11871143.1, Extended European Search Report mailed Jan. 26, 2015", 7 pgs.
"European Application Serial No. 11871143.1, Response filed Aug. 20, 2015 to Extended European Search Report mailed Jan. 26, 2015", 16 pgs.
"Japanese Application Serial No. 2014-525989, Office Action mailed Jul. 19, 2016", W/ English Translation, 3 pgs.
"Japanese Application Serial No. 2014-525989, Response filed Dec. 16, 2017 to Office Action mailed Jul. 19, 2016", W/ Machine Translation, 15 pgs.
"Japanese Application Serial No. 2015-133635, Office Action mailed Apr. 26, 2016", W/ English Translation, 6 pgs.
"Japanese Application Serial No. 2015-133635, Response filed Oct. 26, 2016 to Office Action mailed Apr. 26, 2016", W/ English Translation of Claims, 13 pgs.
Schmidl, Tim, "Clause 6 OFDM PHY Draft", Project IEEE P802.15 Working Group for Wireless Personal Area Networks (WPANs), IEEE P802.15g/D0.1, Jan. 2010 IEEE P802.15-10-0013-00-004g, (Jan. 11, 2010), 21 pgs.
Tim, Schmidl, "Wireless Personal Area Networks Project", Title Clause 6 OFDM PHY Draft,IEEE P802.15, IEEEP802.15 Working Group for Wireless Personal Area Networks(WPANs), [Online] Retrieved from the internet: <https://mentor.ieee.org/802.15/documents?is_dcn=0013&is_group=004g>, (Jan. 11, 2010).

\* cited by examiner

SYSTEMS, METHODS, AND APPARATUS FOR A LOW RATE PHY STRUCTURE

RELATED APPLICATIONS

This application is a continuation of U.S. patent application Ser. No. 13/977,553, filed Jan. 22, 2014, now issued as U.S. Pat. No. 9,313,301, which is a U.S. National Stage Filing under 35 U.S.C. 371 from International Application No. PCT/US2011/064674, filed Dec. 13, 2011 and published in English as WO 2013/028216, which claims the benefit of priority to U.S. Provisional Patent Application Ser. No. 61/526,917, filed on Aug. 24, 2011, entitled: "Methods and Techniques for Low Rate PHY Structure," each of which is hereby incorporated by reference in its entirety.

FIELD

This invention generally relates to wireless communication systems, and in particular, to systems, methods, and apparatus for a low rate PHY structure in Wi-Fi communications.

BACKGROUND

The physical layer is the first and lowest layer in the seven-layer open systems interconnection (OSI) model of computer networking, and it provides certain communication foundations for wireless communications using the IEEE 802.11 standards, IEEE Std. 802.11-2007, published in 2007. The implementation of the physical layer is often termed PHY; however, the physical layer itself includes the basic hardware transmission technologies of a network, and defines how raw bits are transmitted over a network. The bit stream may be grouped into code words or symbols and converted to a physical signal for transmission over a hardware transmission medium. The physical layer provides an electrical, mechanical, and procedural interface to the transmission medium, including the broadcast frequencies and the modulation schemes.

Wireless connectivity for computers is now well-established and virtually all new laptops contain a Wi-Fi capability. Of the wireless local area network (WLAN) solutions that are available, the IEEE 802.11 standard, often termed Wi-Fi, has become the de-facto standard. By using the IEEE 802.11 standards, system operating speeds of around 54 Mbps are commonplace and Wi-Fi is able to compete well with wired systems. Wi-Fi hotpots are in common use, and they allow communications without cable connections. Some of the established IEEE 802.11 standards may provide wireless connectivity for common devices such as laptops and smartphones. However, high bandwidth communications protocols may not be ideal for Internet connectivity with certain devices, such as small, battery-powered sensors that may have limited battery capacity, that may require extended wireless link ranges, or that do not need to communicate at high data rates.

The IEEE 802.11ah task group was recently formed to provide an orthogonal frequency-division multiplexing (OFDM) system operating in the 1 GHz and lower bands. One of the goals of the IEEE 802.11ah task group is to reuse the IEEE 802.11n/ac system with new features that meet certain criteria, including long range, low data rate service (for long-range sensors, for example). Therefore, systems having bandwidths of approximately 1 to 16 MHz are being investigated for use with IEEE 802.11ah. These bandwidths may be provided by down-clocking the IEEE 802.11ac system; however, not all of the requirements for providing service may be met without additional modifications to the IEEE 802.11ac PHY structure.

BRIEF DESCRIPTION OF THE FIGURES

Reference will now be made to the accompanying figures and flow diagrams, which are not necessarily drawn to scale, and wherein.

DETAILED DESCRIPTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is understood that embodiments of the invention may be practiced without these specific details. In other instances, well-known methods, structures and techniques have not been shown in detail in order not to obscure an understanding of this description. References to "one embodiment," "an embodiment," "example embodiment," "various embodiments," etc., indicate that the embodiment(s) of the invention described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object, merely indicates that different instances of like objects are being referred to, and are not intended to imply that the objects so described must be in a given sequence, either temporally, spatially, in ranking, or in any other manner.

Certain embodiments of the invention may include systems, methods, and apparatus for a low rate PITY structure. According to an example embodiment of the invention, a method is provided for generating a low rate PHY structure with low overhead. The method may include generating a preamble comprising one or more training fields; generating a data field; grouping the preamble and the data field into a low rate PHY structure that is compatible with an IEEE 802.11ac PHY structure; and converting the low rate PITY structure for wireless transmission over a hardware transmission medium.

According to an example embodiment of the invention, a system is provided. The system may include one or more sensing or information devices; one or more antennas; at least one memory for storing data and computer-executable instructions; and at least one processor configured to access the at least one memory and the one or more sensing or information devices. The at least one processor is further configured to execute the computer-executable instructions for: generating a preamble comprising one or more training fields; generating a data field comprising information associated with the one or more sensing or information devices; grouping the preamble and the data field into a low rate PHY structure; and converting the low rate PHY structure into a physical signal for wireless transmission over a hardware transmission medium, wherein the hardware transmission medium comprises at least one of the one or more antennas.

Example embodiments may include an apparatus. The apparatus may include at least one memory for storing data and computer-executable instructions; and at least one processor configured to access the at least one memory. The at least one processor is further configured to execute the computer-executable instructions for: generating a preamble comprising one or more training fields; generating a data field comprising information associated with the one or more sensing or information devices; grouping the preamble and the data field into a low rate PHY structure; and converting the low rate PHY structure into a physical signal for wireless transmission over a hardware transmission medium.

Certain embodiments of the invention may enable a new physical layer implementation (PHY) structure within an open systems interconnection model (OSI model) for detection and reception associated with certain wireless communications protocols. Example embodiments may enable certain increased range requirements, for example, for use in wirelessly connecting long-range sensors to the Internet. Example embodiments may enable reduced power requirements for wireless communication, for example, with battery-powered devices. According to example embodiments, certain requirement goals associated with the IEEE 802.11ah wireless communication standard may be enabled. Example embodiments may include a new preamble structure for the long-range portion of the IEEE 802.11ah specification. Example embodiments may allow reuse or re-purposing of certain hardware.

Example embodiments may modify the IEEE 802.11ac PHY to provide lower clock rates. However, PHY structure, according to the IEEE 802.11ac specification, may not include a sufficiently long enough preamble to detect devices at longer ranges. Simply repeating the data portion of the payload may not allow the receiver to function properly since the preamble may not be sufficiently long enough for quality acquisition, timing and channel estimation. Using spread spectrum technologies (such as code division multiple access) may provide certain benefits for acquisition, timing, and channel estimation at the lower clock rates, but such technologies may require a different PHY and may not allow complete reuse of the OFDM hardware that may be required for the other modes of IEEE802.11ah.

In accordance with an example embodiment, a preamble structure is created for the long range portion (also referred to as low rate PHY) of the IEEE 802.11ah system. Example embodiments may allow sufficient detection and reception of the payload, in addition to repetition in the data portion of the payload. The payload may use OFDM signals to allow reuse of hardware. Additionally, the structure may include an additional option for the preamble to allow additional reuse of the hardware.

Data that may be used to configure the receiver or to convey the payload structure in the preamble portion may cause a great deal of overhead in long-range signals. This is because long-range signals may require repetition of the data to allow acceptable detection probability. Thus, any reduction in the signaling that is required to make the receiver aware of the payload contents may be beneficial to the overall system performance. According to an example embodiment, the overhead associated with the preamble may be minimized.

As an example, if an IEEE 802.11ah system with a down-clocking of 1/8 requires a repetition factor to be 4 to meet the required detection probability, the legacy signal field (L-SIG) which takes 4*8=32 s would require four times as long (4*32=128 s).

Figure 1:
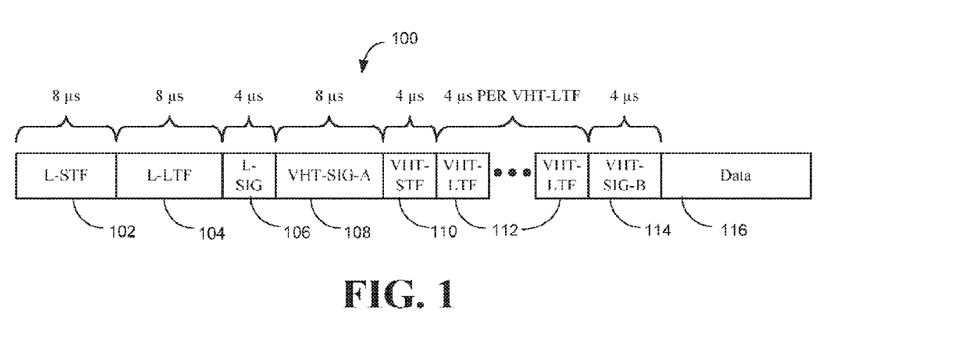
FIG. 1 is a block diagram of an 802.11ac PHY payload.

FIG. 1 shows the payload 100 for an IEEE 802.11ac system. As can be seen, the preamble includes a legacy short training field (L-STF) 102, a legacy long training field (L-LTF) 104, a legacy signal field (L-SIG) 106, a very high throughput signal field A (VHT-SIG-A) 108, a very high throughput short training field (VHT-STF) 110, very high throughput long training fields (VHT-LTFs) 112, a very high throughput signal field B (VHT-SIG-B) 114, followed by the data 116.

If the IEEE 802.11ac system, as shown in FIG. 1, were just down-clocked to meet the 802.11ah bandwidth requirements, the overhead for a low rate PHY would be the L-SIG 106, VHT-SIG-A 108, VHT-STF 110, VHT-LTF 112 and VHT-SIG-B 114. According to an example embodiment, this overhead (which in an IEEE 802.11ac system may take 24 s) may be unnecessary for use in an IEEE 802.11ah system. As an example, if the IEEE 802.11ac system were down-clocked by 1/8 to fit the bandwidth requirements of the IEEE 802.11ah system, there would be 152 s associated with such overhead. In addition, more time may be required, since detection at a long range may be required for the low rate PHY portion. If we again assume a 4× repetition to meet the detection requirements, the total overhead could be 152*4=608 s. A significant savings in overhead may be achieved with example embodiments of the invention, as compared with a simple down-clocked IEEE 802.11ac system. Furthermore, even if the IEEE 802.11ac system were modified to remove the fields after the L-SIG 106, an additional advantage of saving 4*8*4=128 s may be achieved in example embodiments of the invention.

According to certain example aspects of the invention, the low rate PHY may provide single stream support for binary phase shift keying (BPSK) modulation coding schemes and quadrature phase shift keying (QPSK) modulation schemes or modulation rates, and may extend the range of operation. According to an example embodiment, the overhead fields after the L-SIG 106 may not be required. According to an example embodiment, the L-SIG 106 field may be omitted as well.

Figure 2:
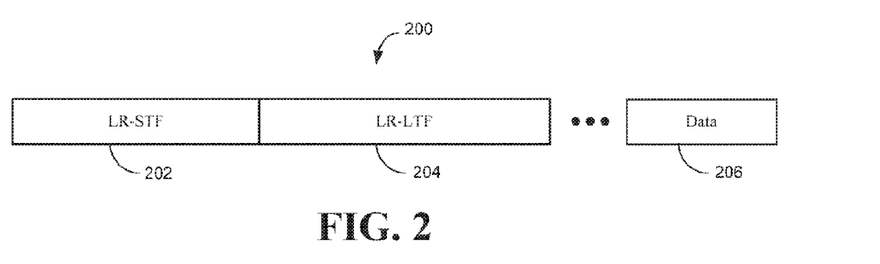
FIG. 2 is a block diagram of an illustrative low rate PHY preamble and payload, according to an example embodiment of the invention.

FIG. 2 depicts a low rate PHY preamble 200, according to an example embodiment. In an example embodiment, the low rate PHY preamble 200 may include a low rate short training field (LR-STF) 202 followed by a low rate long training field (LR-LTF) 204, and then followed by data 206. According to an example embodiment, no signal fields or additional training fields may be needed. According to an example embodiment, the additional training fields may not be necessary since there may be no need for multi-stream transmissions for the low rate PHY.

Figure 3:
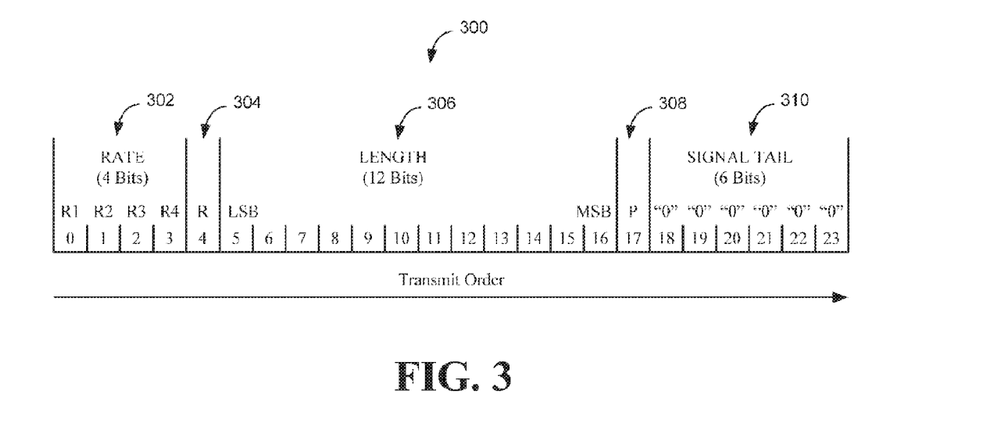
FIG. 3 is a block diagram of an 802.11ac L-SIG field.

FIG. 3 depicts an allocation of the L-SIC field 300 (which may also correspond to 106 of FIG. 1). The L-SIC 300 includes a rate field 302, a reserved bit 304, a length field 306, a parity bit 308, and signal tail bits 310. According to an example embodiment, in order to remove the L-SIG 300 from the overhead of the preamble (as discussed above), such information may be conveyed to the receiver by other means, for example, by the LR-STF 202, the LR-LTF 204, or the data 206 fields as shown in FIG. 2.

According to an example embodiment, the rate field 302 may be replaced or represented by 1 bit to represent either BPSK or QPSK, which, according to an example embodiment, may be the only two modulation schemes used for the low rate PHY. In an example embodiment, such information may be conveyed to the receiver by other means, for example, by the LR-STF 202, the LR-LTF 204, or the data 206 fields as shown in FIG. 2. According to an example embodiment, even providing an indication of the modulation scheme with a representation of the rate field 302 may be unnecessary, and nay be omitted or removed.

According to an example embodiment, if the L-SIG field is not needed then the reserved bit 304 is also not needed. According to an example embodiment, the information provided in the length field 306 may be needed because it may be used to tell other devices to stay off the airwaves. According to an example embodiment, the length field 306 information may be conveyed in the data field portion of the payload (for example, 206 of FIG. 2). In an example embodiment, such conveyance using the data field may be justified since, in the low data rate sensor application, the probability of two devices being awake and on the air transmitting/receiving at the same time is extremely small, on the order of 0.01%, for example. According to example embodiments, sensors for which embodiments of low rate PHY are likely to be utilized, typically are very low power devices that have extremely low duty cycles. Even with many sensors (on the order of 100s) which have small bursts of data to transmit, the likelihood that two devices are awake at the same time is very low. According to an example embodiment, other devices may not see the transmission so the length field in the L-SIG for deferral information may not be needed.

Continuing in reference to FIG. 3 again, the parity bit 308 may not be needed if there is no signal field. Finally, the signal tail 310, which normally requires 6 bits to flush the encoder, may be unnecessary if there is no information being transmitted with the L-SIG field.

Figure 4:
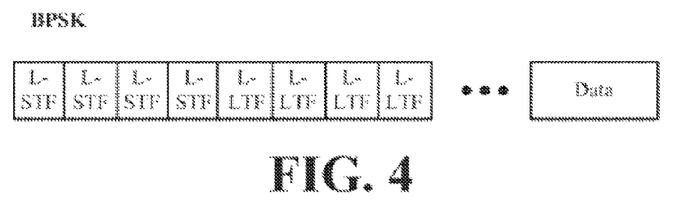
FIG. 4 is a block diagram of example repeated L-STF and L-LTF fields for a binary phase shift keying (BPSK) modulation coding scheme according to an example embodiment of the invention.

According to an example embodiment, certain legacy fields may include information that will need to be retained in the new low rate PHY for certain signaling. For example, the modulation and coding scheme (MCS) signaling and data rate signaling may need to be conveyed in the new PHY structure. According to example embodiments, the low rate PHY may only need to convey two MCSs: BPSK and QPSK, both using code rate 1/2. Thus, according to an example embodiment, only two modes may need to be detected or signaled to the receiver. According to an example embodiment, the current IEEE 802.11ac fields may be reused as much as possible. According to an example embodiment, an overlay sequence may be used for the repetition for the LR-LTF and/or the LR-STF. For example, if it assumed the range requirement of the low rate mode is such that a repetition of 4 is required, then, according to an example embodiment, the BPSK mode may repeat the L-LTF and send 4 L-LTF sequences. Similarly, according to an example embodiment, the BPSK mode may repeat the L-STF and send 4 L-STF sequences. An example of this embodiment is depicted in FIG. 4.

Figure 5:
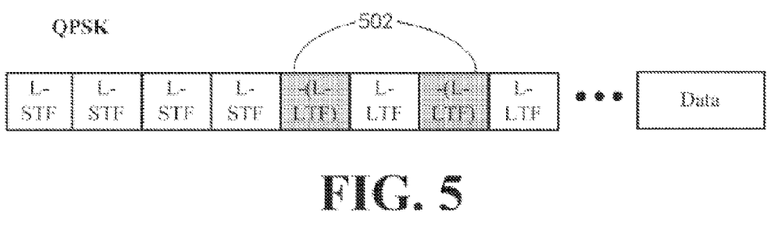
FIG. 5 is a block diagram of example repeated L-STF and L-LTF fields for quadrature phase shift keying modulation (QPSK) coding scheme according to an example embodiment of the invention.

In the case of the QPSK mode, and according to an example embodiment, the sequence may consist of repeated L-LTF and L-STF, but the 4× repetition to meet range requirements may include alternating the sequences by negating every other repetition of L-LTF 502. This example embodiment is depicted in FIG. 5. In this manner, integration at the receiver of the total sequence may result in one of the modulations (BPSK or QPSK) being zero depending on the sequence the receiver is correlation against.

According to an example embodiment, once the LR-LTF is processed, the receiver may then have knowledge of the modulation that was used in the payload portion of the packet. This may remove the need for the L-SIG field which, in this example, may remove significant overhead. As noted, the data portion of the payload may include the information for length. This approach also reuses blocks of the IEEE 802.11ac receiver by reusing the L-LTF and L-STF fields.

Figure 6:
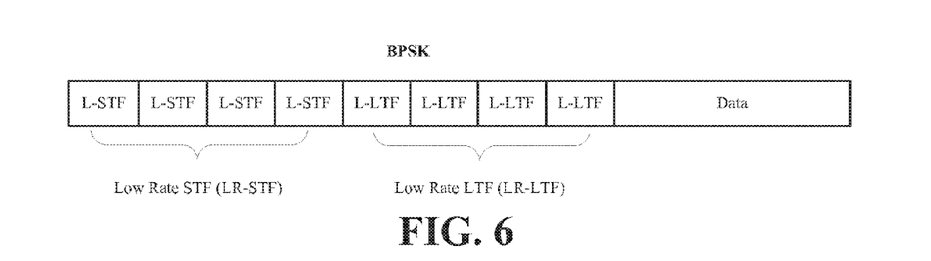
FIG. 6 shows an example packet structure for a low rate PHY for BPSK, according to an example embodiment of the invention.
Figure 7:
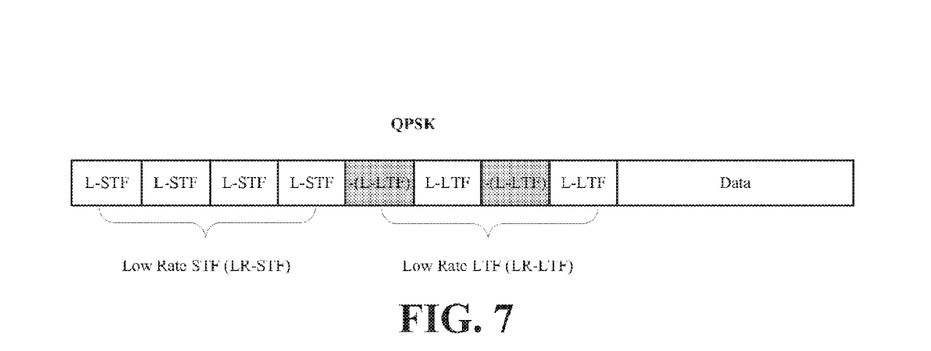
FIG. 7 shows an example packet structure for a low rate PHY for QPSK, according to an example embodiment of the invention.

FIGS. 6 and 7 represent example packet structures for a low rate PHY for BPSK and QPSK, respectively, according to example embodiments of the invention. In these example embodiments, the low rate PHY packet structures may include repeated L-STF fields to make up the LR-STF field. For the BPSK embodiment shown in FIG. 6, the LR-LTF field may include repeated L-LTF fields. For the QPSK embodiment shown in FIG. 7, alternating L-LTF fields may be negated, as discussed previously. According to an example embodiment, the alternating negating of the L-LTF fields may allow the receiver to determine the modulation coding scheme via correlation without needing to use overhead to signal the coding scheme.

In accordance with another example embodiment, new signals could be defined for the L-LTF to allow signaling of the modulation. Such a waveform could be a PN-code, where two orthogonal, or nearly orthogonal, codes are used, one for each modulation. In this case, and according to an example embodiment, detection may be achieved by correlating against the two different codes.

Referring again to FIGS. 4-7, and according to example embodiments, the L-STF and/or L-LTF fields may include a single instance, or may be repeated as necessary to meet range requirements.

Figure 8:
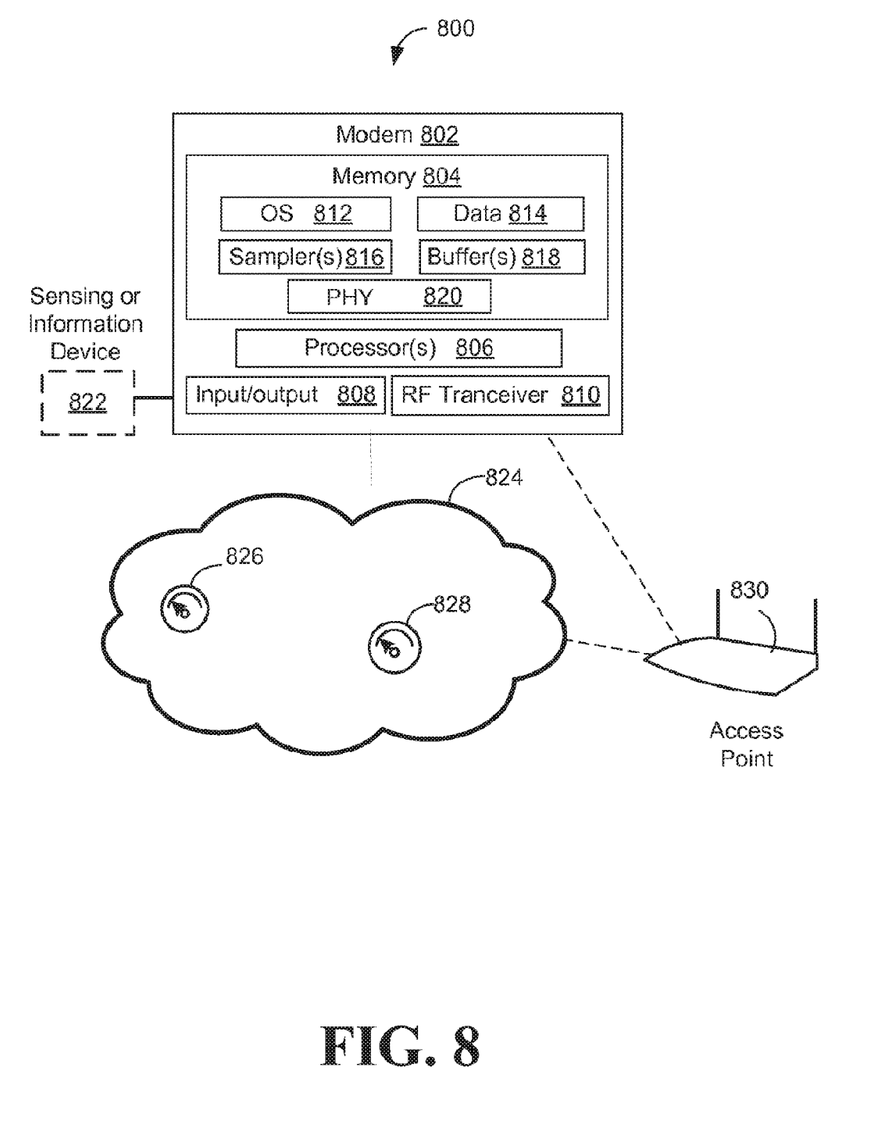
FIG. 8 is a block diagram of a low rate PHY transceiver and communications system, according to an example embodiment of the invention.

FIG. 8 depicts a block diagram of a low rate PHY transceiver and communications system 800, according to an example embodiment of the invention. In an example embodiment, the system 800 may be utilized for wirelessly communicating with an access point 830, either directly, via a wireless network 824, or among other modem/transceivers 826, 828 associated with the wireless network 824.

According to an example embodiment, the system 800 may include a modem 802 that may provide input from a sensing or information device 822, and may provide output information via the input/output 808, or via a radio frequency transceiver 810. According to an example embodiment, the sensing or information device 822 could include a computer, a laptop, a switch, a detector, a myriad of sensor types, etc. According to an example embodiment, the radio frequency transceiver 810 may connect to one or more internal antennas. According to an example embodiment, the radio frequency transceiver 810 may connect to one or more external antennas, which according to example embodiments, may or may not be considered an integral component of the modem 802.

According to example embodiments, the modem 802 of the system 800 may perform the basic functions associated with communicating information from the sensing or information device 822 to the access point 830 or other modem/transceivers 826, 828 in the wireless network 824. According to an example embodiment, the modem 802 may include a memory 804, processor(s) 806, an input/output port 808, and a radio frequency transceiver 810. According to an example embodiment, the memory 804 may include an operating system 812 or microprocessor-readable instructions. In an example embodiment, the memory 804 may include and handle data 814. According to an example embodiment, the memory may include buffers 818. According to certain example embodiments, at least a portion of the memory 804 may be utilized as a sampler 816. In an example embodiment, the sampling may be considered as hardware related and may be considered to be handled by processor(s) 806. In an example embodiment, the memory 804 may include a section dedicated to the PHY structure 820. In an example embodiment, the PHY structure 820 may be handled by processor(s) 806.

Figure 9:
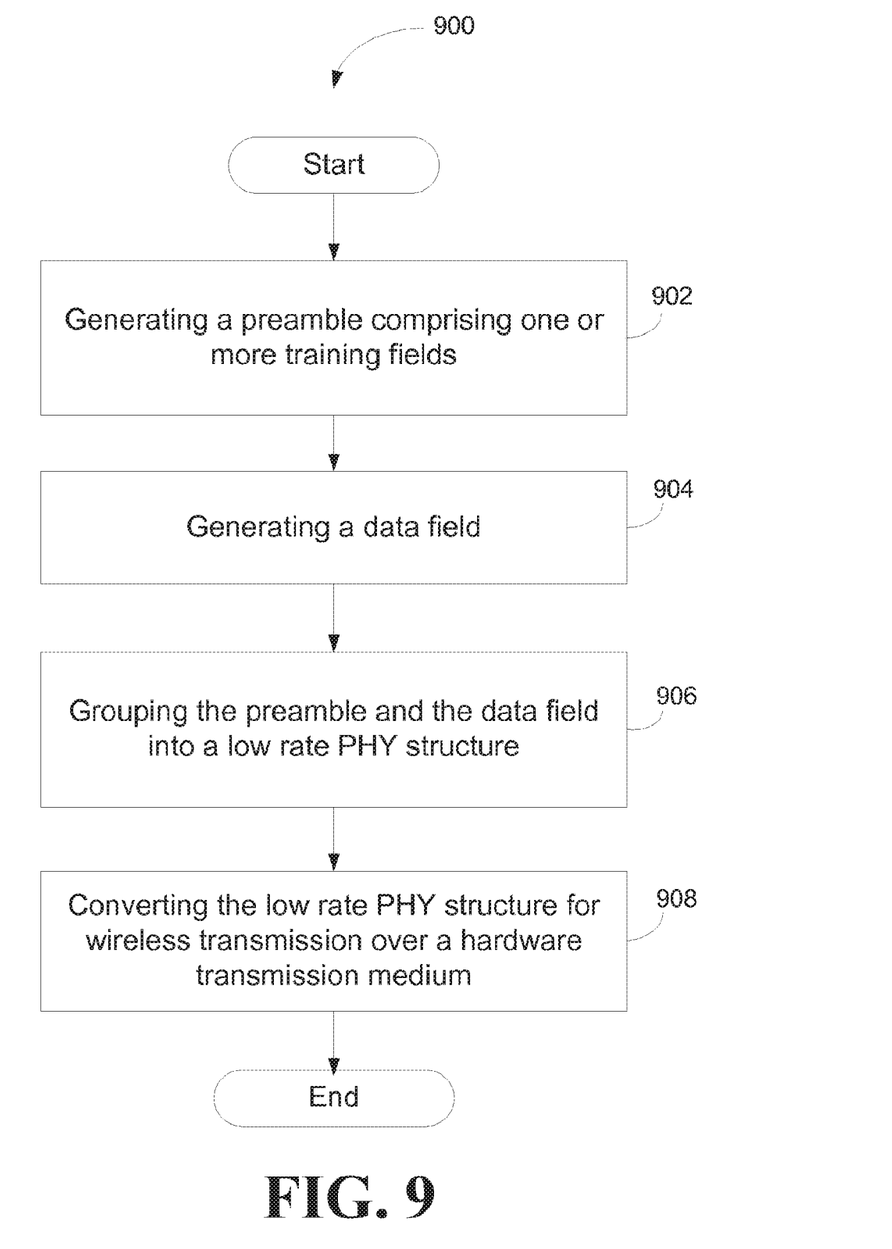
FIG. 9 is a flow diagram of an example method, according to an example embodiment of the invention.

An example method 900 for generating a low rate PHY structure with low overhead will now be described with reference to the flow diagram of FIG. 9. The method 900 starts in block 902, and according to an example embodiment includes generating a preamble comprising one or more training fields. In block 904, the method 900 includes generating a data field. In block 906, the method 900 includes grouping the preamble and the data field into a low rate PHY structure. In block 908, the method 900 includes converting the low rate PHY structure into a physical signal for wireless transmission over a hardware transmission medium. The method 900 ends after block 908.

According to example embodiments, generating the one or more training fields includes generating a low rate short training field (LR-STF), wherein the LR-STF includes at least one legacy short training field (L-STF) and one or more repetitions of the L-STF, wherein a number of repetitions of the L-STF corresponds to range or sensitivity requirements of the hardware transmission medium. According to example embodiments, generating the one or more training fields includes generating a low rate long training field (LR-LTF), wherein the LR-LTF includes generating at least one legacy long training field (L-LTF) and one or more repetitions of the L-LTF, wherein a number of repetitions of the L-LTF corresponds to range or sensitivity requirements of the hardware transmission medium. According to example embodiments, grouping the preamble and data field provides a low rate PHY structure that is compatible with an IEEE 802.11ah PHY structure. According to example embodiments, generating the data field includes conveying length field information in the data field. According to example embodiments, grouping the preamble and the data field into a low rate PHY structure includes coding one or more modulation coding schemes into the preamble, wherein the modulation coding schemes include one or more of binary phase shift keying (BPSK) or quadrature phase shift keying (QPSK), wherein coding one or more modulation coding schemes into the preamble may include selectively negating one or more alternating L-LTF fields.

Example embodiments may relate to the IEEE 802.11n/ac/a/g specification, but may operate on a separate frequency. Example embodiments may process the low rate PHY, utilizing systems based on the IEEE 802.11ac specification.

Example embodiments of the low rate PHY structure may include a low rate PHY packet, which may include STF, LTF, and data. For example, the PHY structure may be a creation of a PHY layer packet for transmission.

Example embodiments include a system and an apparatus. According to example embodiments, the system may include one or more sensing or information devices and one or more antennas. In example embodiments, the system and the apparatus may include at least one memory for storing data and computer-executable instructions; and at least one processor configured to access the at least one memory and the one or more sensing or information devices, and further configured to execute the computer-executable instructions for: generating a preamble comprising one or more training fields; generating a data field comprising information associated with the one or more sensing or information devices; grouping the preamble and the data field into a low rate PHY structure that is compatible with an IEEE 802.11ac PHY structure; and converting the low rate PHY structure into a physical signal for wireless transmission over a hardware transmission medium. According to certain example embodiments, the hardware transmission medium may include at least one of the one or more antennas.

According to example embodiments, the one or more training fields may include a low rate short training field (LR-STF), wherein the LR-STF may include at least one legacy short training field (L-STF) and one or more repetitions of the L-STF, wherein a number of repetitions of the L-STF corresponds to range or sensitivity requirements of the hardware transmission medium. According to example embodiments, the one or more training fields may include a low rate long training field (LR-LTF), wherein the LR-LTF may include at least one legacy long training field (L-LTF) and one or more repetitions of the L-LTF, wherein a number of repetitions of the L-LTF corresponds to range or sensitivity requirements of the hardware transmission medium. According to example embodiments, the data field may include length field information. According to example embodiments, the preamble may include one or more modulation coding schemes, wherein the modulation coding schemes comprise one or more of binary phase shift keying (BPSK) or quadrature phase shift keying (QPSK). According to an example embodiment, the one or more modulation coding schemes may be coded into the preamble by selectively negating one or more alternating L-LTF fields.

According to example embodiments, certain technical effects may be provided, such as creating certain systems and methods that may enable increased wireless range communications by connecting long-range sensors to a wireless network. Example embodiments of the invention may provide the further technical effects of providing systems and methods for reducing power requirements of devices connected to a wireless network.

In example embodiments of the invention, the low-rate PHY transceiver and communications system 800 may include any number of hardware and/or software applications that are executed to facilitate any of the operations. In example embodiments, one or more input/output interfaces may facilitate communication between the low rate PHY transceiver and communications system 800 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the low rate PHY transceiver and communications system 800. The one or more input/output interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the low rate PHY transceiver and communications system 800 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network, any wired network, any wireless network, etc., for communication with external devices and/or systems.

As desired, embodiments of the invention may include the low rate PHY transceiver and communications system 800 with more or less of the components illustrated in FIG. 8.

Certain embodiments of the invention are described above with reference to block and flow diagrams of systems and methods and/or computer program products according to example embodiments of the invention. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Realizations in accordance with the example embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The claimed invention is:

1. An apparatus for use in association with wireless communication, the apparatus comprising:
 a modem to generate and/or transmit a preamble and a data field;
 the preamble comprising a repeated short training field and a repeated long training field;
 the repeated long training field to follow the repeated short training field in the preamble;
 when in operation, the wireless communication to have a bandwidth of 1 megahertz and to use orthogonal frequency division multiplexing;
 the repeated short training field and the repeated long training field to permit desired detection probability at the bandwidth of 1 megahertz;

wherein:
the preamble and the data field are to be comprised in a packet structure;
the preamble and the data field are to be modulated in accordance with binary phase shift keying;
the preamble and the data field are to be coded with a coding rate of one-half; and
the data field is to be repeated in the packet structure;
the preamble also comprises a signal field;
at the 1 megahertz bandwidth of the wireless communication, the signal field, as transmitted, is to have a first duration; and
at another bandwidth of the wireless communication that is greater than the 1 megahertz bandwidth, the signal field is to have a second duration that is decreased compared to the first duration.

2. The apparatus of claim 1, wherein:
the modem is to convert the packet structure into a signal for wireless transmission.

3. The apparatus of claim 2, wherein:
the apparatus further comprises a touch screen user interface device, a sensing device, and/or a battery; and/or the modem further comprises:
at least one antenna;
a radio transceiver; and/or at least one memory to store machine-executable instructions that, when executed by a machine, result in generation and/or the transmission, at least in part, of the preamble and the data field.

4. An apparatus for use in association with wireless communication, the apparatus comprising:
a modem to receive a preamble and a data field;
the preamble comprising a repeated short training field and a repeated long training field;
the repeated long training field to follow the repeated short training field in the preamble;
when in operation, the wireless communication to have a bandwidth of 1 megahertz and to use orthogonal frequency division multiplexing;
the repeated short training field and the repeated long training field to permit desired detection probability at the bandwidth of 1 megahertz;
wherein:
the preamble and the data field are to be comprised in a packet structure;
the preamble and the data field are to be modulated in accordance with binary phase shift keying;
the preamble and the data field are to be coded with a coding rate of one-half; and
the data field is to be repeated in the packet structure;
the preamble also comprises a signal field;
at the 1 megahertz bandwidth of the wireless communication, the signal field, as transmitted, is to have a first duration; and
at another bandwidth of the wireless communication that is greater than the 1 megahertz bandwidth, the signal field is to have a second duration that is decreased compared to the first duration.

5. The apparatus of claim 4, wherein:
the modem is to convert a received radio frequency signal into the packet structure.

6. The apparatus of claim 5, wherein:
the apparatus further comprises a touch screen user interface device, a sensing device, and/or a battery; and/or the modem further comprises:
at least one antenna;
a radio transceiver; and/or at least one memory to store machine-executable instructions that, when executed by a machine, result in reception, at least in part, of the preamble and the data field.

7. A method for use in association with wireless communication, the method comprising:
generating and/or transmitting by a modem a preamble and a data field;
the preamble comprising a repeated short training field and a repeated long training field;
the repeated long training field to follow the repeated short training field in the preamble;
when in operation, the wireless communication to have a bandwidth of 1 megahertz and to use orthogonal frequency division multiplexing;
the repeated short training field and the repeated long training field to permit desired detection probability at the bandwidth of 1 megahertz;
wherein:
the preamble and the data field are to be comprised in a packet structure;
the preamble and the data field are to be modulated in accordance with binary phase shift keying;
the preamble and the data field are to be coded with a coding rate of one-half; and
the data field is to be repeated in the packet structure;
the preamble also comprises a signal field;
at the 1 megahertz bandwidth of the wireless communication, the signal field, as transmitted, is to have a first duration; and
at another bandwidth of the wireless communication that is greater than the 1 megahertz bandwidth, the signal field is to have a second duration that is decreased compared to the first duration.

8. The method of claim 7, wherein:
the modem is to convert the packet structure into a signal for wireless transmission.

9. The method of claim 8, wherein:
the modem further comprises:
a touch screen user interface device;
a sensing device;
a battery;
at least one antenna;
a radio transceiver; and/or at least one memory to store machine-executable instructions that, when executed by a machine, result in generation and/or the transmission, at least in part, of the preamble and the data field.

10. A method for use in association with wireless communication, the method comprising:
receiving by a modem a preamble and a data field;
the preamble comprising a repeated short training field and a repeated long training field;
the repeated long training field to follow the repeated short training field in the preamble;
when in operation, the wireless communication to have a bandwidth of 1 megahertz and to use orthogonal frequency division multiplexing;
the repeated short training field and the repeated long training field to permit desired detection probability at the bandwidth of 1 megahertz;
wherein:
the preamble and the data field are to be comprised in a packet structure;
the preamble and the data field are to be modulated in accordance with binary phase shift keying;
the preamble and the data field are to be coded with a coding rate of one-half; and
the data field is to be repeated in the packet structure;
the preamble also comprises a signal field;

at the 1 megahertz bandwidth of the wireless communication, the signal field, as transmitted, is to have a first duration; and at another bandwidth of the wireless communication that is greater than the 1 megahertz bandwidth, the signal field is to have a second duration that is decreased compared to the first duration.

11. The method of claim 10, wherein:
the modem is to convert a received radio frequency signal into the packet structure.

12. The method of claim 11, wherein:
the modem further comprises:
a touch screen user interface device;
a sensing device;
a battery;
at least one antenna;
a radio transceiver; and/or at least one memory to store machine-executable instructions that, when executed by a machine, result in reception, at least in part, of the preamble and the data field.

13. At least one memory storing machine-executable instructions that, when executed by a machine, result in operations comprising:
generating and/or transmitting by a modem a preamble and a data field for use in wireless communication;
the preamble comprising a repeated short training field and a repeated long training field;
the repeated long training field to follow the repeated short training field in the preamble;
when in operation, the wireless communication to have a bandwidth of 1 megahertz and to use orthogonal frequency division multiplexing;
the repeated short training field and the repeated long training field to permit desired detection probability at the bandwidth of 1 megahertz;
wherein:
the preamble and the data field are to be comprised in a packet structure;
the preamble and the data field are to be modulated in accordance with binary phase shift keying;
the preamble and the data field are to be coded with a coding rate of one-half; and
the data field is to be repeated in the packet structure;
the preamble also comprises a signal field;
at the 1 megahertz bandwidth of the wireless communication, the signal field, as transmitted, is to have a first duration; and
at another bandwidth of the wireless communication that is greater than the 1 megahertz bandwidth, the signal field is to have a second duration that is decreased compared to the first duration.

14. The at least one memory of claim 13, wherein:
the modem is to convert the packet structure into a signal for wireless transmission.

15. The at least one memory of claim 14, wherein:
the modem further comprises:
a touch screen user interface device;
a sensing device;
a battery;
at least one antenna; and/or a radio transceiver.

16. At least one memory storing machine-executable instructions that, when executed by a machine, result in operations comprising:
receiving, via wireless communication, by a modem a preamble and a data field;
the preamble comprising a repeated short training field and a repeated long training field;
the repeated long training field to follow the repeated short training field in the preamble;
when in operation, the wireless communication to have a bandwidth of 1 megahertz and to use orthogonal frequency division multiplexing;
the repeated short training field and the repeated long training field to permit desired detection probability at the bandwidth of 1 megahertz;
wherein:
the preamble and the data field are to be comprised in a packet structure;
the preamble and the data field are to be modulated in accordance with binary phase shift keying;
the preamble and the data field are to be coded with a coding rate of one-half; and
the data field is to be repeated in the packet structure;
the preamble also comprises a signal field;
at the 1 megahertz bandwidth of the wireless communication, the signal field, as transmitted, is to have a first duration; and
at another bandwidth of the wireless communication that is greater than the 1 megahertz bandwidth, the signal field is to have a second duration that is decreased compared to the first duration.

17. The at least one memory of claim 16, wherein:
the modem is to convert a received radio frequency signal into the packet structure.

18. The at least one memory of claim 17, wherein:
the modem further comprises:
a touch screen user interface device;
a sensing device;
a battery;
at least one antenna; and/or a radio transceiver.

* * * * *